United States Patent [19]
Nakamura

[11] Patent Number: 5,703,914
[45] Date of Patent: Dec. 30, 1997

[54] CLOCK RECOVERY CIRCUIT EMPLOYING DELAY-AND-DIFFERENCE CIRCUIT AND PULSE-SEQUENCE DETECTION

[75] Inventor: Seizo Nakamura, Tokyo, Japan

[73] Assignee: Oki Electric Industry Co., Ltd., Tokyo, Japan

[21] Appl. No.: 508,045

[22] Filed: Jul. 27, 1995

[30] Foreign Application Priority Data

Jul. 29, 1994 [JP] Japan ................................. 6-178693

[51] Int. Cl.$^6$ ........................................ H04L 7/00
[52] U.S. Cl. ........................................ 375/355; 375/376
[58] Field of Search ........................ 375/327, 326, 375/316, 324, 328, 285, 346, 349, 350, 356, 371, 373, 375, 376, 354, 355; 370/108, 100.1; 329/309, 310

[56] References Cited

U.S. PATENT DOCUMENTS

| | | | |
|---|---|---|---|
| 3,878,475 | 4/1975 | Okano et al. | 329/307 |
| 5,416,805 | 5/1995 | Tonello et al. | 375/344 |
| 5,448,201 | 9/1995 | Kawabata | 329/304 |

FOREIGN PATENT DOCUMENTS

| | | |
|---|---|---|
| 0558034A2 | 9/1993 | European Pat. Off. . |
| 0637883A2 | 2/1995 | European Pat. Off. . |
| 2 143 096 | 1/1985 | United Kingdom . |
| 2 233 177 | 1/1991 | United Kingdom . |

OTHER PUBLICATIONS

Nakamura, Iguchi, and Kodama, U.S. Patent Application Serial No. 08/307,632, filed Sep. 20, 1994 on the basis of an earlier International Application designating the U.S.

Akaiwa & Nagata, "A Linear Modulation Method for Digital Mobile Radio Communication", Institute of Electronics & Communication Engineers of Japan, 1985, No. 2384.

Mobuta et al, "π/4–shift QPSK Differential Demodulator for Digital Cordless Telephone," Spring 1992 Meeting of Institute of Electronics, Communication & Information Engineers,B–344.

Matsumoto et al, "A study on Clock Recovery Circuit for π/4–shift QPSK Signals," 1993 Spring Meeting of Institute of Electronics, Communication & Information Engineers of Japan, B–317.

Primary Examiner—Tesfaldet Bocure
Assistant Examiner—Bryan Webster
Attorney, Agent, or Firm—Rabin, Champagne & Lynt, P.C.

[57] ABSTRACT

A clock recovery circuit receives an input signal having an eye pattern and takes differences at certain intervals to generate a differential signal. A set of comparators detect timings at which the differential signal matches different levels, and generate pulse signals at these timings. A gate-signal generating circuit detects timing relationships among these pulse signals, and activates a gate signal when pulse sequences having certain timing relationships are detected. A delay circuit delays one of the pulse signals to create a delayed signal. A gate circuit outputs the delayed signal as a timing signal when the gate signal is active. A phase-locked loop generates a clock signal synchronized to the timing signal.

22 Claims, 10 Drawing Sheets

5,703,914

CLOCK RECOVERY CIRCUIT EMPLOYING DELAY-AND-DIFFERENCE CIRCUIT AND PULSE-SEQUENCE DETECTION

BACKGROUND OF THE INVENTION

The present invention relates to a clock recovery circuit for use in a demodulator such as a π/4-shift quaternary phase-shift-keying differential demodulator.

π/4-shift quaternary phase-shift keying (QPSK) is used to modulate carrier signals in, for example, digital mobile communication systems. The data to be transmitted consist of two-bit symbols. The phase of the carrier signal is shifted by −3π/4, −π/4, π/4, or 3π/4 radians in each symbol interval to encode the value of the symbol. A differential demodulator recovers the transmitted data by detecting these phase shifts. That is, it detects the value of a differential phase signal, indicating the difference between the current instantaneous carrier phase and the phase one symbol duration before.

Operation of a differential demodulator is synchronized to a clock signal that indicates where the center of each symbol interval occurs. The clock signal is recovered from the transmitted signal itself. To facilitate clock recovery, a transmission begins with a preamble having a fixed, repetitive data pattern. Typically the symbols "10" and "01" are sent alternately during the preamble, causing the carrier phase to shift alternately by 3π/4 and −π/4.

One conventional clock recovery circuit operates by detecting zero crossings of the differential phase signal. Ideally, these zero crossings occur at the boundaries between symbol intervals. Unfortunately, in the preamble described above, symbol boundaries are crossed at the midpoint (π/4) between 3π/4 and −π/4, and zero crossings occur somewhat before and after the symbol boundaries. This creates a problem known as jitter, which can lead to loss of clock synchronization, or cause the clock signal to become deadlocked in a state exactly opposite to the correct phase.

Jitter can also arise from carrier frequency offset between the transmitter and receiver. This type of jitter affects clock recovery in the entire data transmission, not just the preamble.

One proposed solution to the problem of jitter employs a double differential phase signal, obtained by taking the difference between the current value of the differential phase signal and the value one symbol interval before. During the preamble, if the differential phase signal alternates between 3π/4 and −π/4, the double differential phase signal will alternate between π and −π. The midpoint between π and −π is zero, so zero crossings will occur at symbol boundaries, without jitter. Jitter due to frequency offset is also eliminated.

This proposed solution engenders a further problem, however, in that after the preamble ends and transmission of arbitrary data begins, zero crossings by the double differential phase signal occur at many points far removed from the symbol boundaries, hindering the maintenance of correct clock synchronization.

SUMMARY OF THE INVENTION

It is accordingly an object of the present invention to provide reliable clock recovery both during and after the preamble.

The invented clock recovery circuit receives an input signal that follows an arbitrary trajectory among levels which represent symbol values. A delay-and-difference circuit delays the input signal to obtain a delayed signal, and takes the difference between the input signal and delayed signal to obtain a differential signal. A plurality of comparators compare the differential signal with a plurality of levels, and generate respective pulse signals when the differential signal matches these levels.

A gate-signal generating circuit detects sequences of these pulse signals having certain timing relationships and activates a gate signal for a certain interval when these sequences occur. A delay circuit delays one of the pulse signals to obtain delayed pulses. A gate circuit outputs the delayed pulses as timing pulses when the gate signal is active. A phase-locked loop generates a clock signal and locks the clock signal in phase to the timing pulses.

DETAILED DESCRIPTION OF THE INVENTION

Two embodiments of the invention will now be described with reference to the attached illustrative drawings. The first two drawings illustrate the format of a typical transmission from which a clock signal is to be recovered, and the general configuration of a differential demodulator in which the invention can be employed.

Figure 1:
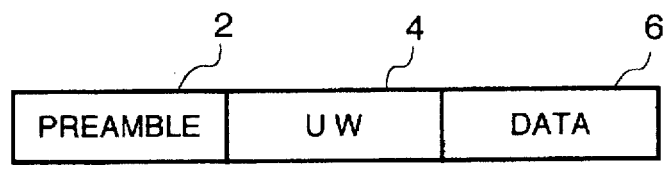
FIG. 1 shows the general format of a π/4-shift QPSK transmission.

Referring to FIG. 1, in certain mobile communication systems, each transmission starts with a preamble 2 in which the data pattern is "10011001 . . . 1001." The preamble is followed by a data header 4 (labeled UW in the drawing), then the body of the data 6.

Figure 2:
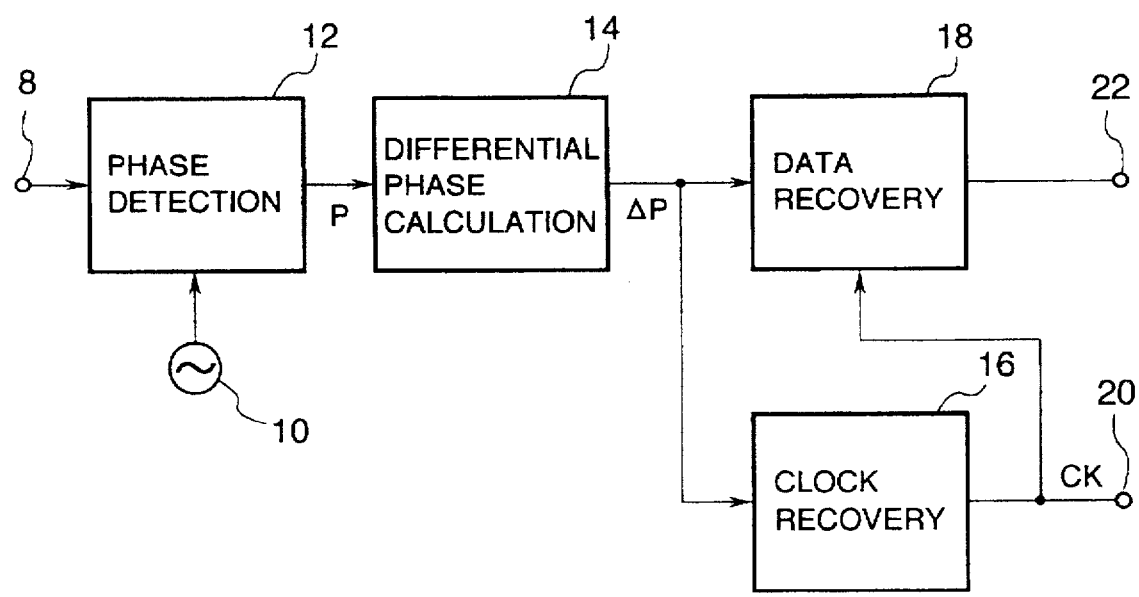
FIG. 2 is a general block diagram of a differential demodulator.

Referring to FIG. 2, a differential demodulator has an input terminal 8 at which it receives a modulated carrier signal. A local oscillator 10 generates an unmodulated carrier signal with a frequency substantially equal to the frequency of the modulated carrier signal. An instantaneous phase detection circuit 12 compares the phase of the modulated carrier with the phase of the unmodulated carrier and converts the difference between them to a digital value, which it outputs as an instantaneous phase signal P. A differential phase calculation circuit 14 takes the difference between the instantaneous phase signal P and the instantaneous phase signal P delayed by one symbol interval, to obtain a differential phase signal ΔP.

The differential phase signal ΔP is supplied to a clock recovery circuit 16 and data recovery circuit 18. The clock recovery circuit 16 recovers a clock signal CK, which it outputs at an output terminal 20 and also sends to the data recovery circuit 18. The data recovery circuit 18 samples the differential phase signal ΔP at timings designated by the clock signal CK, decodes the sampled values to recover the transmitted data, and outputs these data at an output terminal 22. The clock signal CK output at terminal 20 is used in subsequent processing of the data output at terminal 22.

Figure 3:
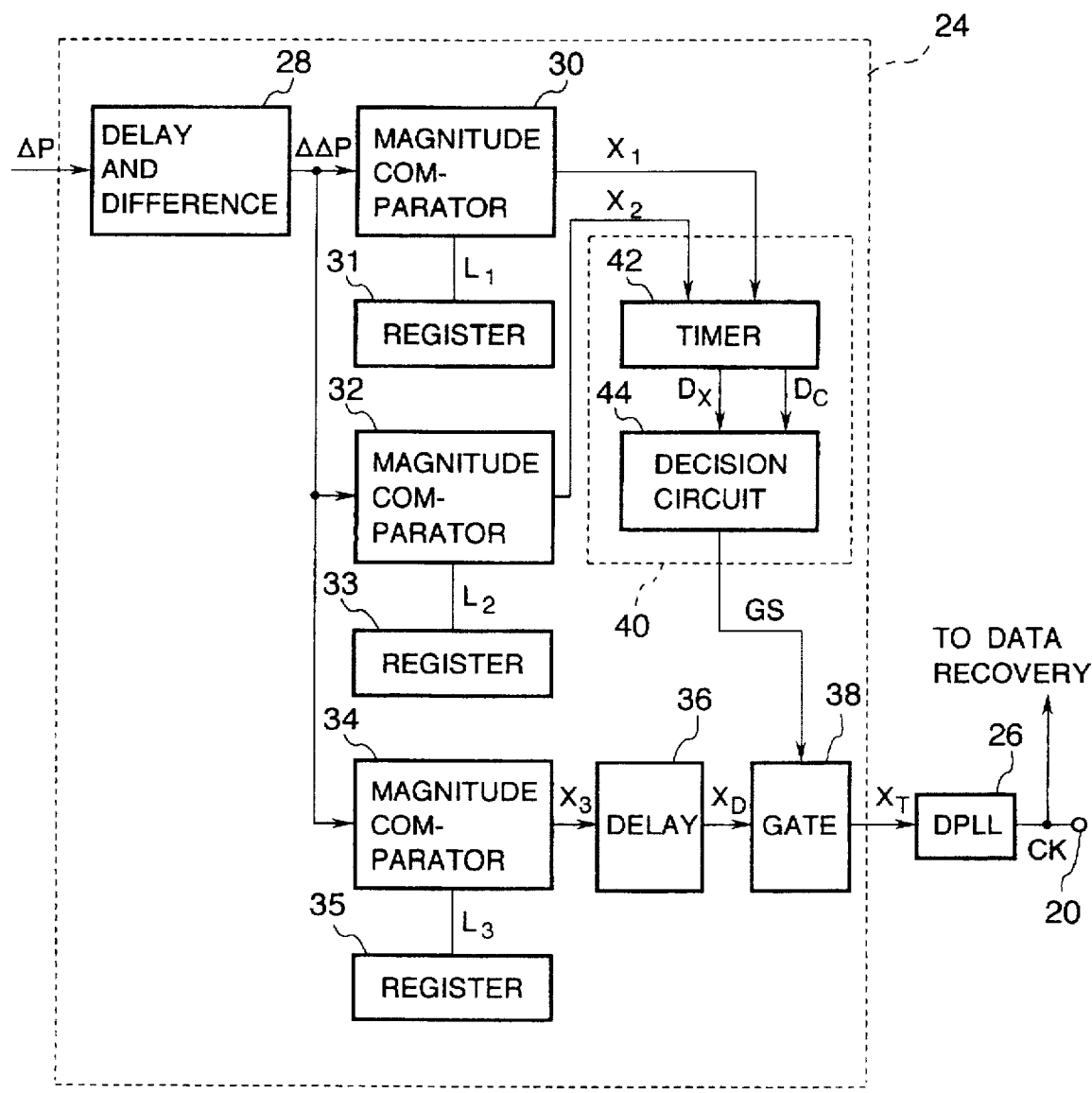
FIG. 3 is a block diagram of the invented clock recovery circuit.

FIG. 3 shows the configuration of a first embodiment of the invention, which can be employed as the clock recovery circuit 16 in FIG. 2. The invented clock recovery circuit comprises a timing pulse generating circuit 24 and a digital phase-locked loop 26. The timing pulse generating circuit 24 comprises a delay-and-difference circuit 28, a first magnitude comparator 30 and first register 31, a second magnitude comparator 32 and second register 33, a third magnitude comparator 34 and third register 35, a delay circuit 36, a gate circuit 38, and a gate-signal generating circuit 40. The gate-signal generating circuit 40 comprises a timer 42 and decision circuit 44.

The digital phase-locked loop (DPLL) 26 is a well-known circuit that outputs a clock signal CK, certain transitions (e.g. rising transitions) of which are synchronized to coincide, on the average, with pulses occurring in a timing signal $X_T$ (these pulses will be referred to as timing pulses $X_T$). The frequency of the clock signal CK has a fixed value equal to the (known) symbol rate. The digital phase-locked loop 26 operates by advancing the phase of the clock signal CK when transitions of the clock signal CK are found to lag timing pulses $X_T$, and retarding the phase of the clock signal CK when transitions of the clock signal CK are found to lead timing pulses $X_T$. The clock signal CK is used as the clock signal CK in FIG. 2.

In the timing pulse generating circuit 24, the delay-and-difference circuit 28 receives the differential phase signal ΔP, stores each received value of the differential phase signal ΔP for a time T equal to the known length of one symbol interval, and takes the difference between the current value of the differential phase signal ΔP and the value received one symbol interval before to obtain a double differential phase signal ΔΔP.

The symbol interval length T is the period of the clock signal CK. In dealing with phase, it is convenient to speak in terms of angular measure, so that T is equivalent to 360°, or 2π radians. The values of the differential and double differential phase signals ΔP and ΔΔP can also be measured in terms of angle. In the following explanation degrees will be used to describe T and other time values, while radians will be used to describe ΔP and ΔΔP.

The double differential phase signal ΔΔP is supplied to the three magnitude comparators 30, 32, and 34. The first magnitude comparator 30 compares the value of ΔΔP with a first level $L_1$, which is stored in the first register 31, and outputs a first pulse $X_1$ when the value of ΔΔP matches $L_1$. Similarly, the second magnitude comparator 32 compares ΔΔP with a second level $L_2$, stored in the second register 32, and outputs a second pulse $X_2$ when ΔΔP matches $L_2$. Likewise, the third magnitude comparator 34 compares ΔΔP with a third level $L_3$, stored in the third register 35, and outputs a third pulse $X_3$ when ΔΔP matches $L_3$.

In this first embodiment $L_1$ is 3π/4, $L_2$ is –3π/4, and $L_3$ is zero. The third pulses $X_3$ are accordingly zero-matching pulses.

The delay circuit 36 delays each third pulse $X_3$ by a time equivalent to half a symbol interval (T/2, or 180°). The delay circuit 36 can be, for example, a digital timer that is triggered by input of a third pulse $X_3$, counts for a time equal to T/2, then outputs a delayed pulse $X_D$.

The first and second pulses $X_1$ and $X_2$ are supplied to the timer 42 in the gate-signal generating circuit 40. The timer 42 is a counter that is driven at a constant rate, so that its count value represents elapsed time. When the timer 42 receives either pulse $X_1$ or $X_2$, it outputs to the decision circuit 44 a pulse discriminating signal $D_X$ indicating which pulse ($X_1$ or $X_2$) was received, and data $D_C$ indicating the current count value. Then the timer 42 is reset to an initial value such as zero and starts counting again. Thus the count value $D_C$ indicates the timing relationship between the two most recent pulses. If the count reaches a certain value Td without input of another pulse ($X_1$ or $X_2$), the timer 42 is automatically reset to its initial value and stops counting. Td is equivalent to, for example, 160°.

The decision circuit 44 outputs a gate signal GS according to the most recent count value $D_C$ and two most recent pulse discriminating signals $D_X$. The gate signal GS is normally inactive. When the decision circuit 44 receives a pulse discriminating signal $D_X$, if the accompanying count data $D_C$ is not the initial count value, indicating that the two most recent pulses were received within time Td of each other, and if the current and preceding pulse discriminating signals $D_X$ are different (indicating that pulse $X_1$ was preceded by $X_2$, or $X_2$ by $X_1$), then the decision circuit 44 activates the gate signal GS for a certain time Tg. This time Tg can be equivalent to 120°, or T/3. The decision circuit 44 comprises, for example, a pair of latches for storing the two most recent pulse discriminating signals $D_X$, an exclusive-OR gate for comparing these signals, and a comparator for comparing the count data $D_C$ with the above-mentioned initial value. Table 1 summarizes the operation of the gate-signal generating circuit 40.

TABLE 1

| Operation of Gate-Signal Generating Circuit | |
|---|---|
| Input | Gate Signal GS |
| $X_2$ pulse followed within time Td by $X_1$ pulse | Active for time Tg starting from $X_1$ pulse |
| $X_1$ pulse followed within time Td by $X_2$ pulse | Active for time Tg starting from $X_2$ pulse |
| Other input | Inactive |

The gate circuit 38 receives the delayed pulse signal $X_D$ and gate signal GS. While GS is active, the gate circuit 38 passes $X_D$ through to the digital phase-locked loop 26 as the above-mentioned timing signal $X_T$. When GS is inactive, the gate circuit 38 blocks the delayed pulse signal $X_D$. The gate circuit 38 can be a simple logic gate such as an AND gate.

The operation of the first embodiment will now be described with reference to FIGS. 2 to 16.

Figure 4:
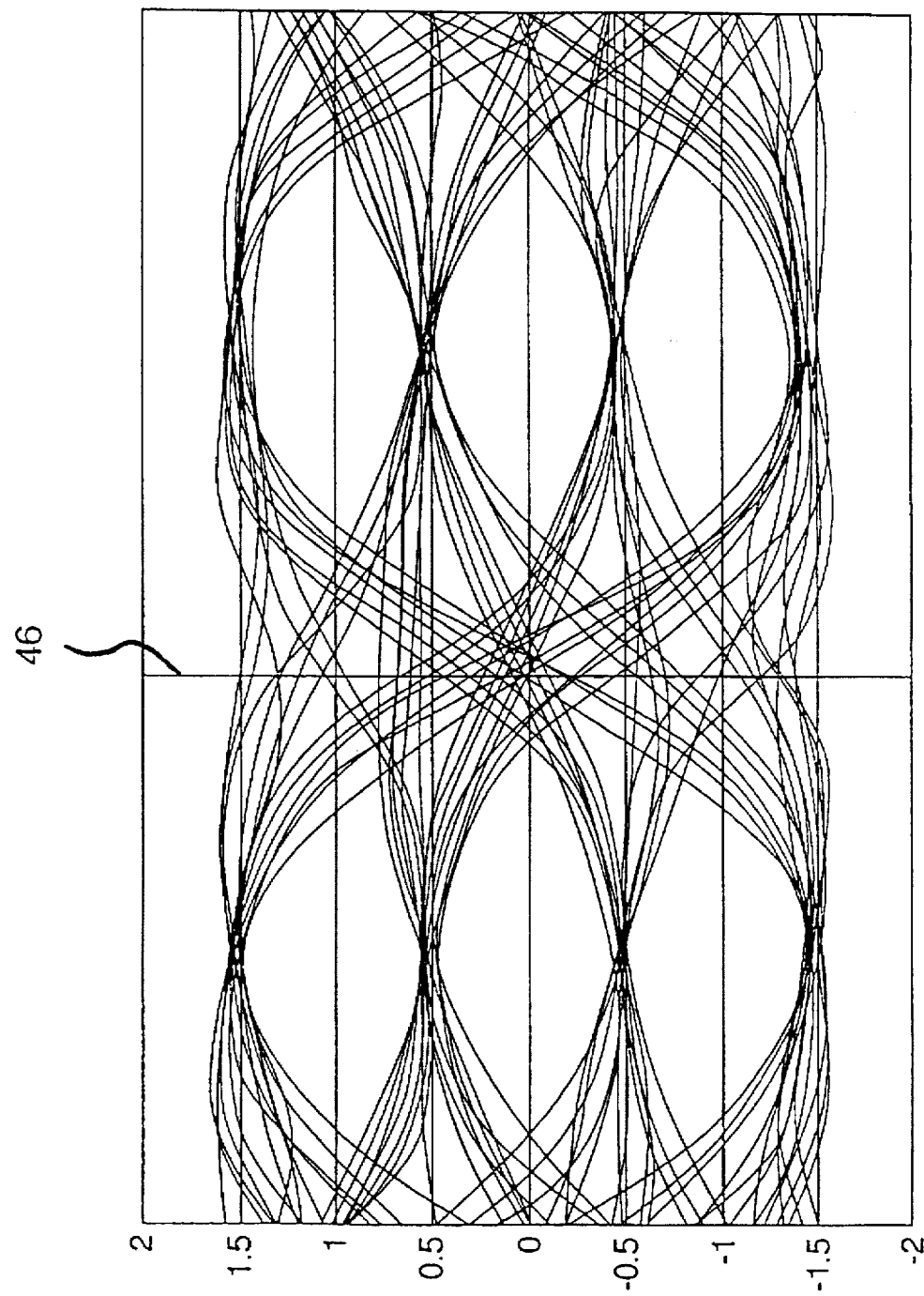
FIG. 4 shows an eye pattern of a differential phase signal without frequency offset.

FIG. 4 shows a simulated eye pattern of the differential phase signal ΔP when there is no frequency offset between the transmitter and receiver; that is, when the frequency of the modulated carrier signal received at input terminal 8 in FIG. 2 is exactly equal to the frequency of the unmodulated carrier signal output by the oscillator 10. The horizontal axis indicates time. The vertical line 46 represents a symbol boundary. The vertical axis indicates the value of the differential phase signal ΔP in multiples of π/2, so that 1 corresponds to π/2, and −0.5 to −π/4. FIG. 4 is obtained by plotting all possible trajectories of the differential phase signal ΔP, both during and after the preamble. Zero crossings are concentrated in the vicinity of the symbol boundary 46.

Figure 5:
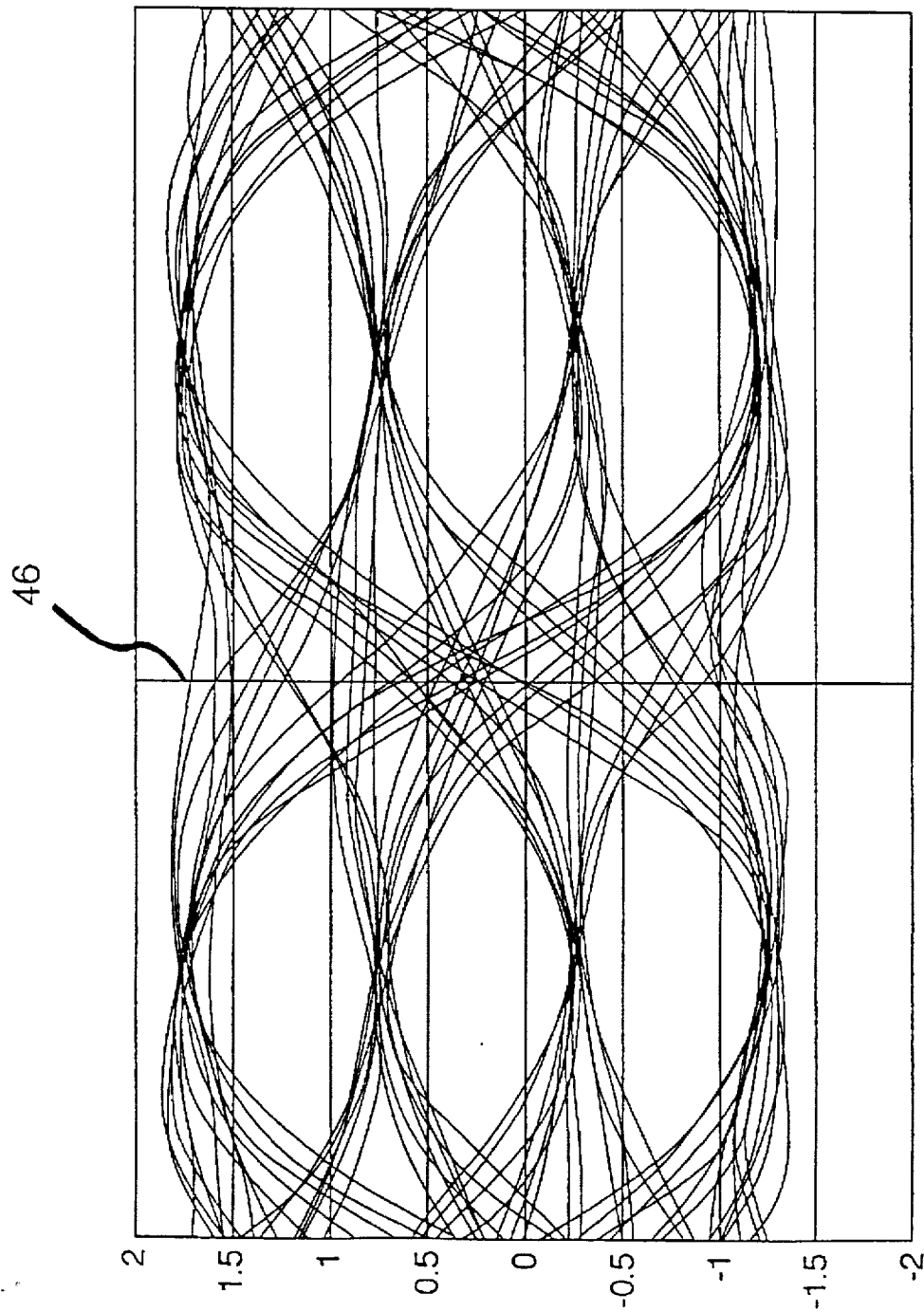
FIG. 5 shows an eye pattern of a differential phase signal with frequency offset.

FIG. 5 shows a simulated eye pattern of the differential phase signal ΔP when frequency offset is present (the frequencies of the modulated and unmodulated carrier signals are not equal). The horizontal and vertical axes have the same meaning as in FIG. 4. The offset is equivalent to π/8. The entire eye pattern is shifted upward, and zero crossings tend to occur at considerable distances from the symbol boundary 46. In a conventional clock recovery circuit employing the differential phase signal ΔP, severe jitter would occur.

Figure 6:
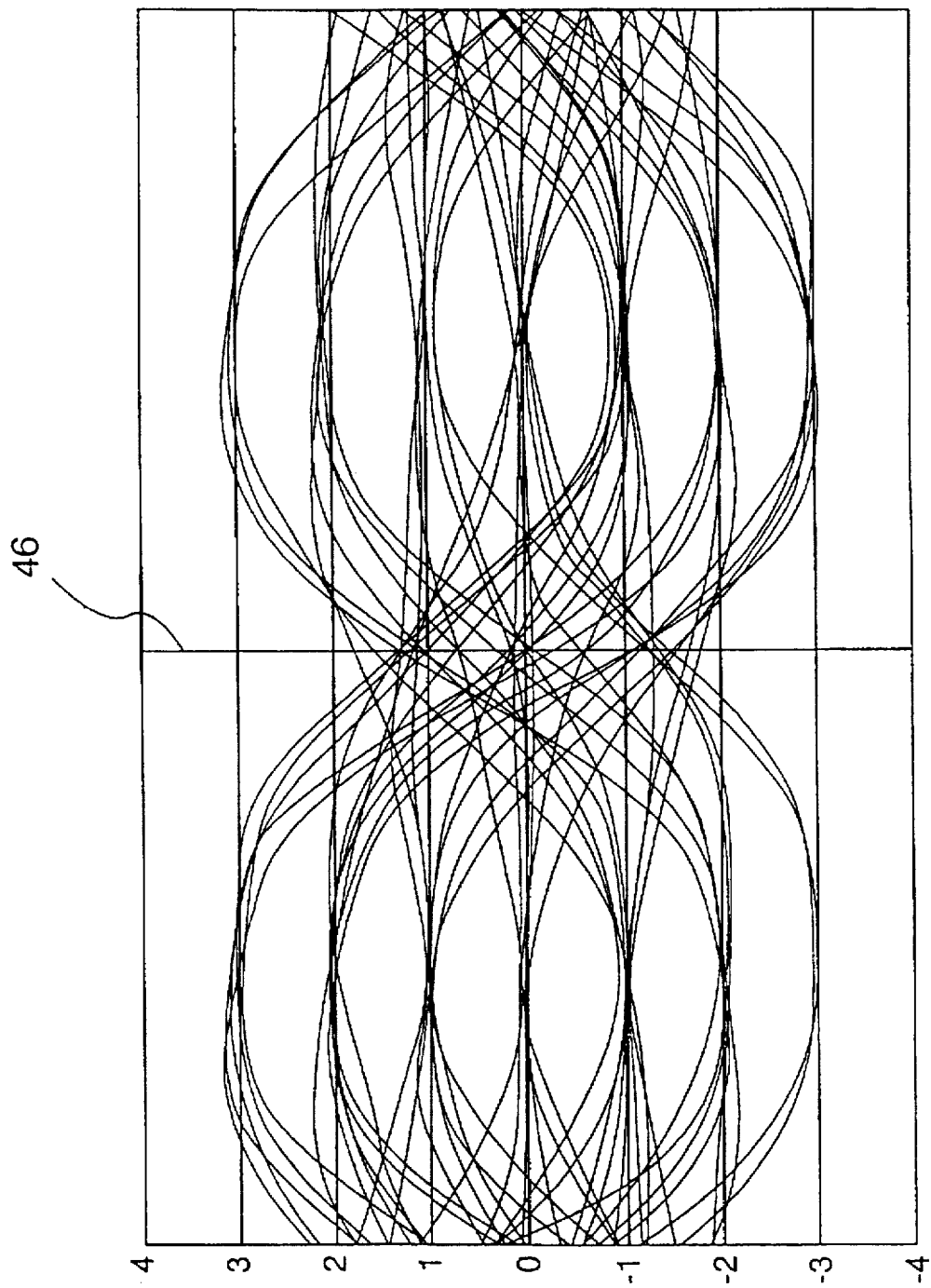
FIG. 6 shows an eye pattern of a double differential phase signal without frequency offset.

FIG. 6 shows a simulated eye pattern of the double differential phase signal ΔΔP when frequency offset is absent. The horizontal and vertical axes have the same meaning as in FIG. 4. Although the eye pattern is centered around the zero point on the vertical axis, zero crossings occur at some points that are closer to the centers of the symbol intervals than to the symbol boundary 46. A clock recovery circuit that employed the double differential phase signal ΔΔP but detected only zero crossings would be unstable.

Figure 7:
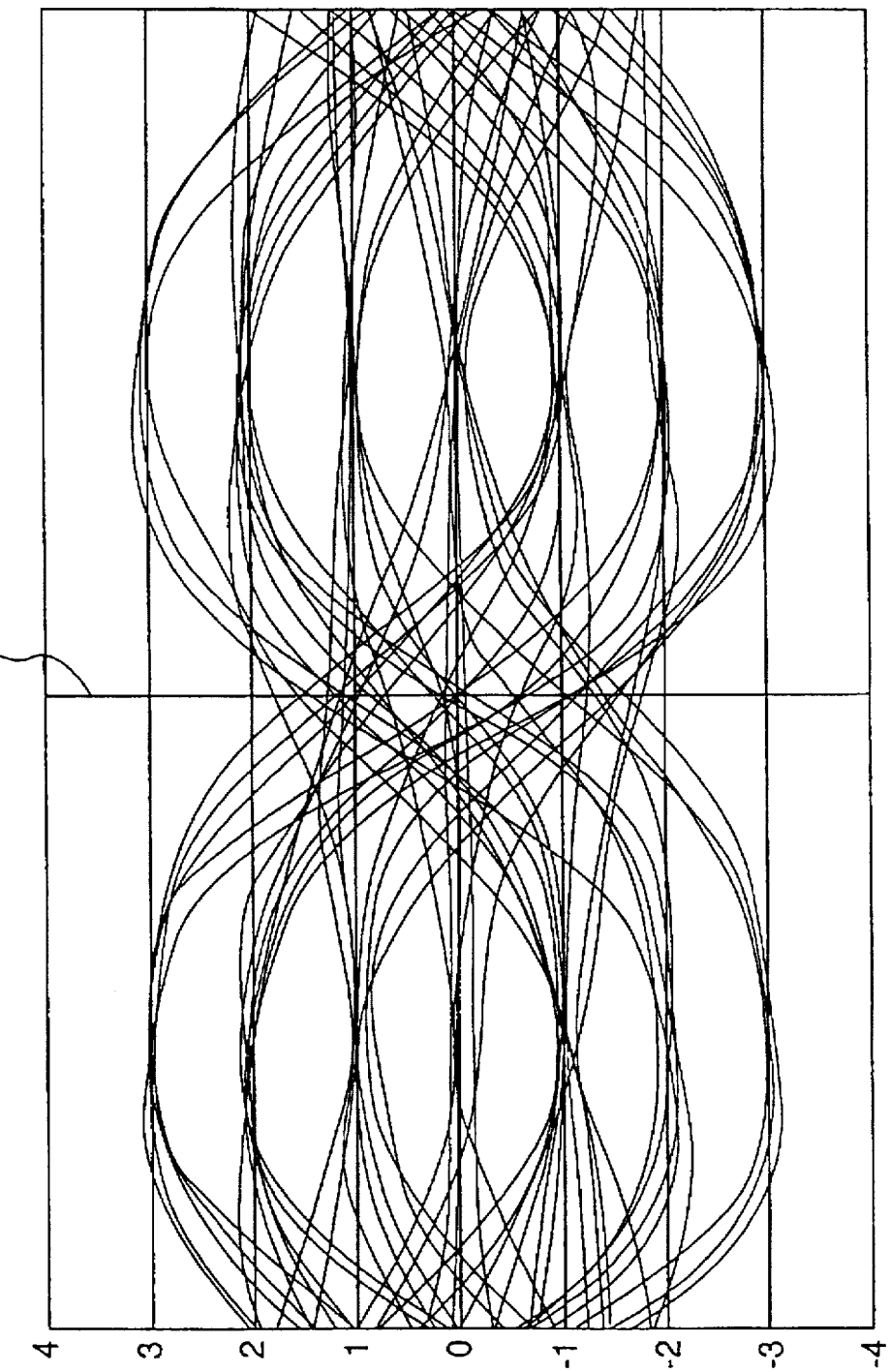
FIG. 7 shows an eye pattern of a double differential phase signal with frequency offset.

FIG. 7 shows a simulated eye pattern of the double differential phase signal ΔΔP when the same frequency offset (π/8) is present as in FIG. 5. The horizontal and vertical axes have the same meaning as in FIG. 4. The eye pattern is still centered around the zero point on the vertical axis; it does not shift upward as in FIG. 5. The problem of jitter is aggravated, however. Zero crossings occur at nearly random locations on the horizontal axis, with many unwanted zero-matching pulses created by trajectories that weave around the zero level.

Figure 8:
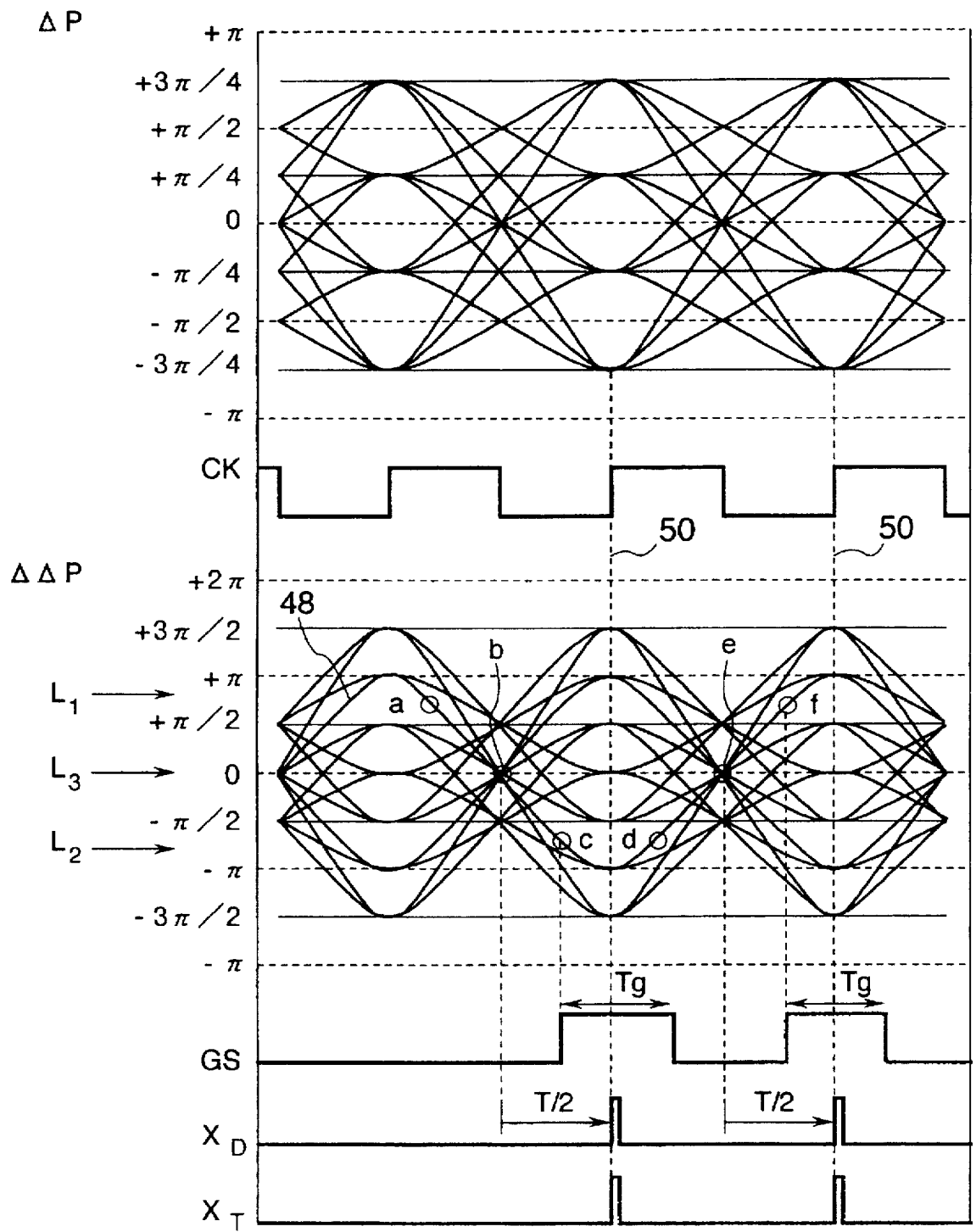
FIG. 8 shows eye patterns of differential and double differential phase signals, and illustrates the operation of the invention during the preamble.

FIG. 8 shows the eye patterns of the differential phase signal ΔP and double differential phase signal ΔΔP schematically, illustrating for simplicity the case in which there is no frequency offset. The waveform of the clock signal CK is shown below the eye pattern of the differential phase signal ΔP, and waveforms of the gate signal GS, delayed pulse signal $X_D$, and timing signal $X_T$ are shown below the eye pattern of the double differential phase signal ΔΔP. The graduations on the vertical axis indicate the values of ΔP and ΔΔP in radians. Levels $L_1$, $L_2$, and $L_3$ are also indicated.

During the preamble, the double differential phase signal ΔΔP alternates between π and −π, following trajectory 48, for example. This trajectory 48 crosses the first, third, and second levels $L_1$, $L_3$, and $L_2$ in this sequence at points a, b, and c. The separation between points a and c is less than Td on the horizontal axis, so the gate-signal generating circuit 40 activates the gate signal GS for time Tg, starting at point c. During this time Tg the delay circuit 36 outputs a delayed pulse signal $X_D$ delayed by time T/2 from the zero crossing at point b. Since GS is active, the gate circuit 38 sends this delayed pulse signal $X_D$ as a timing pulse $X_T$ to the digital phase-locked loop 26.

After passing point c, trajectory 48 reaches −π, then begins to rise toward π again, now crossing the second, third, and first levels $L_2$, $L_3$, and $L_1$ in sequence at points d, e, and f. The separation between points d and f is less than Td on the horizontal axis, so the gate-signal generating circuit 40 activates the gate signal GS again for time Tg, starting at point f. During this time the delay circuit 36 outputs a delayed pulse signal $X_D$ delayed by T/2 from the zero crossing at point e, and the gate circuit 38 passes this pulse on as another timing pulse $X_T$ to the digital phase-locked loop 26. Both timing pulses $X_T$ occur at the centers of symbol intervals, indicated by vertical dashed lines 50. The timing pulses $X_T$ are accordingly free of jitter.

During the preamble, the double differential phase signal ΔΔP continues to repeat the pattern of trajectory 48, so the digital phase-locked loop 26 continues to receive a timing pulse $X_T$ at the center of each symbol interval. Input of these jitter-free pulses enables the digital phase-locked loop 26 to synchronize the clock signal CK rapidly and reliably, so that rising transitions of CK coincide with timing pulses $X_T$, at the centers of the symbol intervals. By sampling the differential phase signal ΔP at rising transitions of the clock signal CK, the data recovery circuit 18 in FIG. 2 can obtain values of the differential phase signal ΔP at the optimal points, where the eye pattern of the differential phase signal ΔP is most open.

After the preamble ends and transmission of the data header and body begins, the double differential phase signal ΔΔP starts following an unpredictable trajectory, and the conditions for activating the gate signal GS are not satisfied in every symbol interval. The digital phase-locked loop 26 accordingly does not receive a timing pulse $X_T$ in every symbol interval as it did during the preamble, but if timing pulses $X_T$ are generated in a sufficient number of symbol intervals, the digital phase-locked loop 26 can still maintain synchronization of the clock signal CK. Operation after the preamble ends will be analyzed in detail next.

The double differential phase signal ΔΔP in two successive symbol intervals is derived from the differential phase signal ΔP in three successive symbol intervals, with four possible values in each interval, so there are sixty-four possible trajectories in all. These trajectories were illustrated in FIGS. 6 and 7, but the large number of superimposed trajectories makes those drawings difficult to interpret. The trajectories will accordingly be described in a more schematic form in FIGS. 9 to 16.

Figure 9:
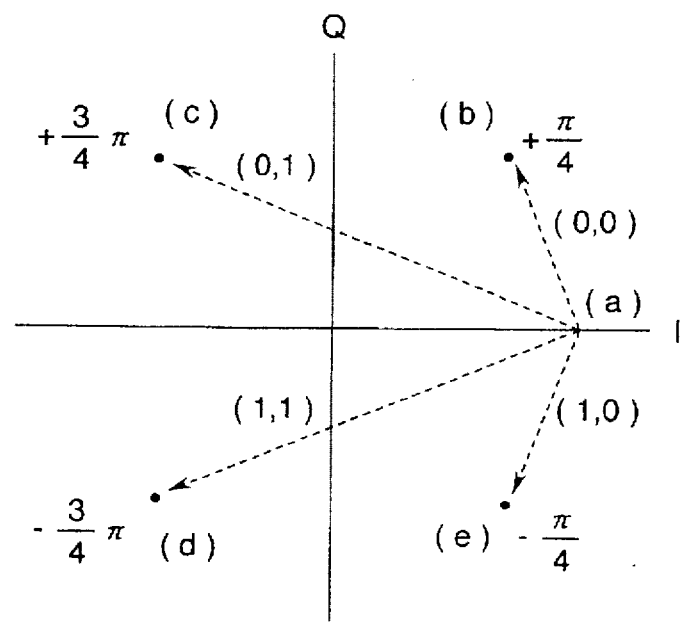
FIG. 9 is illustrates phase shifts on the I–Q plane.

The carrier signal used in QPSK communications can be split into a pair of carrier signals, comprising an in-phase carrier I and quadrature carrier Q, and the received signal can be represented on an I-Q plane as shown in FIG. 9. If point (a) represents the received signal in a certain symbol interval, then the transitions that can occur in the next symbol interval are indicated by the four dashed arrows. Transmitted data (0, 0) will cause a transition to point (b), corresponding to a phase rotation of π/4; data (0, 1) will cause a transition to point (c), corresponding to a phase rotation of 3π/4; data (1, 1) will cause a transition to point (d), corresponding to a phase rotation of −3π/4; and data (1, 0) will cause a transition to point (e), corresponding to a phase rotation of −π/4. Each dashed arrow corresponds to one possible value of the differential phase signal ΔP.

Figure 10:
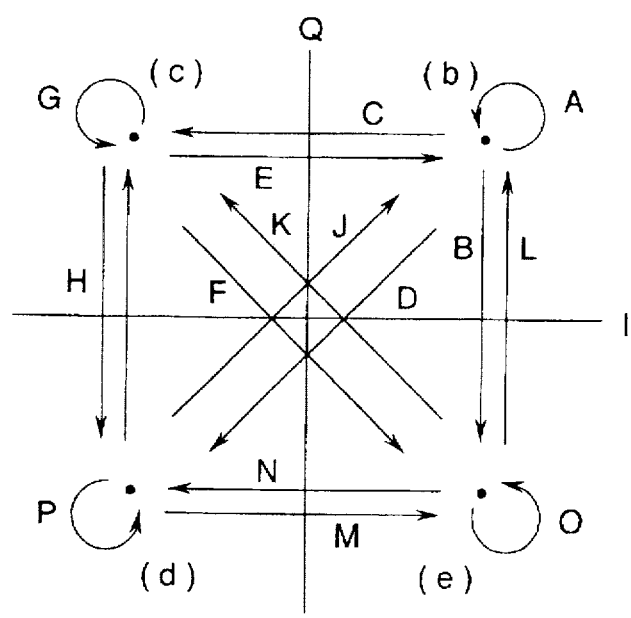
FIG. 10 illustrates transitions among these phase shifts.

FIG. 10 represents the sixteen possible combinations of values of the differential phase signal ΔP in two successive symbol intervals, using arrows labeled from A to P to indicate transitions from one value to the next. These sixteen transition arrows generate corresponding values of the double differential phase signal ΔΔP. For example, transition A indicates two successive phase shifts of π/4, corresponding to bit data (0, 0, 0, 0). The value of the differential phase signal ΔP is π/4 in two successive intervals, so the value of the double differential phase signal ΔΔP is zero. Transition K indicates successive phase shifts of −π/4 and 3π/4, corresponding to bit data (1, 0, 0, 1) and producing a double differential phase signal value of −π.

Figure 11:
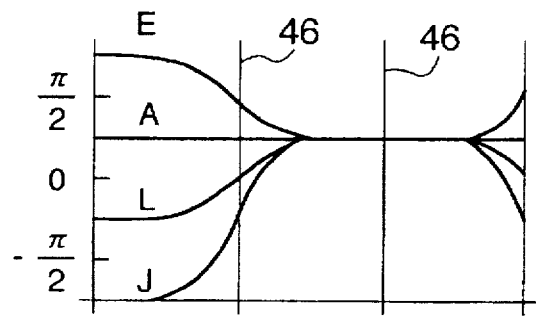
FIG. 11 illustrates several trajectories of the differential phase signal.

FIG. 11 indicates four of the sixty-four possible trajectories of the differential phase signal ΔP over three successive symbol intervals, showing the trajectories in which the differential phase signal ΔP has the value π/4 in the second and third symbol intervals. The value of the differential phase signal ΔP is indicated in radians on the vertical axis. Time is indicated on the horizontal axis, with vertical lines 46 indicating symbol boundaries as before. The letters E, A, L, and J indicate the transitions between the first and second symbol intervals, using the same notation as in FIG. 10.

Figure 14:
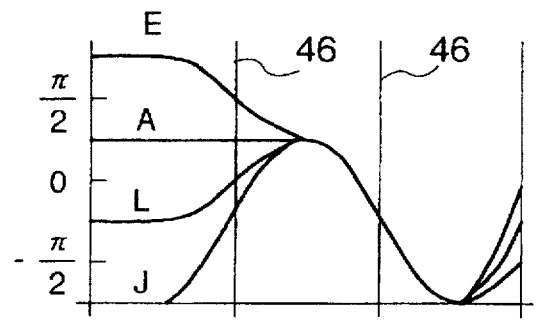
FIG. 14 illustrates several more trajectories of the differential phase signal.
Figure 12:
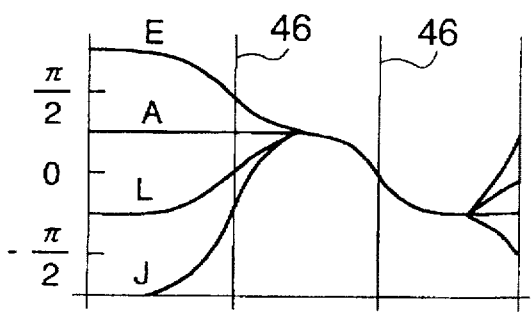
FIG. 12 illustrates several more trajectories of the differential phase signal.
Figure 15:
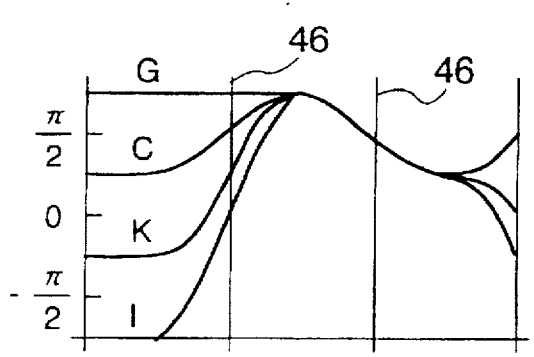
FIG. 15 illustrates several more trajectories of the differential phase signal.
Figure 13:
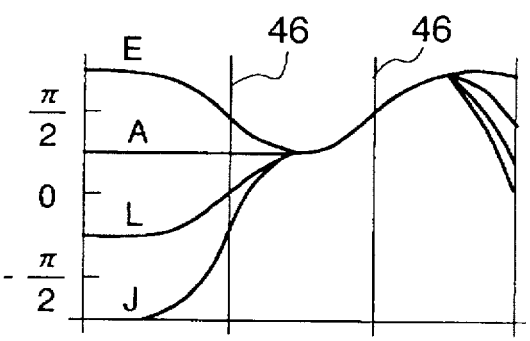
FIG. 13 illustrates several more trajectories of the differential phase signal.
Figure 16:
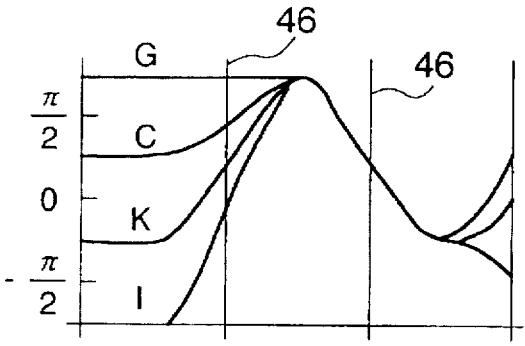
FIG. 16 illustrates several more trajectories of the differential phase signal.

Similarly, FIG. 12 indicates the four trajectories in which the differential phase signal ΔP takes on values of π/4 and −π/4 in the second and third symbol intervals. FIG. 13 indicates the four trajectories with values of π/4 and 3π/4, respectively, in the second and third symbol intervals. FIG. 14 indicates the four trajectories with values of π/4 and −3π/4 in the second and third symbol intervals. FIG. 15 indicates the four trajectories with values of 3π/4 and π/4 in the second and third symbol intervals. FIG. 16 indicates the four trajectories with values of 3π/4 and −π/4 in the second and third symbol intervals. Together, FIGS. 11 to 16 illustrate twenty-four of the sixty-four possible trajectories.

Table 2 lists all sixty-four trajectories, using the same letters A to P to denote transitions of the differential phase signal ΔP between the first and second symbol intervals and between the second and third symbol intervals, indicating the corresponding values of the double differential phase signal ΔΔP, and noting the locations of zero crossing points (denoted 0-Crss) of the double differential phase signal ΔΔP. For example, the first entry in Table 2, corresponding to bit data (0, 0, 0, 0, 0, 0), is for three successive phase shifts of π/4, causing two successive occurrences of transition A, with corresponding values of zero for the double differential phase signal ΔΔP. Two successive occurrences of zero in the double differential phase signal ΔΔP constitute a zero matching but not a zero crossing, so no zero crossing point is listed.

The zero-crossing-point locations in Table 2 are approximate; the exact values depend on the precise shapes of the trajectories.

TABLE 2

| Zero Crossings (0-Crss) of Double Differential Phase Signal ΔΔP | | | | | |
|---|---|---|---|---|---|
| ΔP | ΔΔP | 0-Crss | ΔP | ΔΔP | 0-Crss |
| 2nd Shift = π/4 (b) | | | 2nd Shift = 3π/4 (c) | | |
| A-A | 0 → 0 | — | G-G | 0 → 0 | — |
| A-C | 0 → π/2 | — | G-H | 0 → −3π/2 | — |
| A-D | 0 → π | — | G-F | 0 → −π | — |
| A-B | 0 → −π/2 | — | G-E | 0 → −π/2 | — |
| E-A | −π/2 → 0 | — | C-G | π/2 → 0 | — |
| E-C | −π/2 → π/2 | 0° | C-H | π/2 → −3π/2 | −90° |
| E-D | −π/2 → −π | — | C-F | π/2 → −π | −60° |
| E-B | −π/2 → −π/2 | — | C-E | π/2 → −π/2 | 0° |

TABLE 2-continued

| Zero Crossings (0-Crss) of Double Differential Phase Signal ΔΔP | | | | | |
|---|---|---|---|---|---|
| ΔP | ΔΔP | 0-Crss | ΔP | ΔΔP | 0-Crss |
| J-A | π → 0 | — | K-G | π → 0 | — |
| J-C | π → π/2 | — | K-H | π → −3π/2 | −45° |
| J-D | π → π | 0° | K-F | π → −π | 0° |
| J-B | π → −π/2 | +60° | K-E | π → −π/2 | +60° |
| L-A | π/2 → 0 | — | I-G | 3π/2 → 0 | — |
| L-C | π/2 → π/2 | — | I-H | 3π/2 → −3π/2 | 0° |
| L-D | π/2 → −π | 60° | I-F | 3π/2 → −π | +45° |
| L-B | π/2 → −π/2 | 0° | I-E | 3π/2 → −π/2 | +90° |
| 2nd Shift = π/4 (e) | | | 2nd Shift = 3π/4 (d) | | |
| O-O | 0 → 0 | — | P-P | 0 → 0 | — |
| O-M | 0 → −π/2 | — | P-I | 0 → 3π/2 | — |
| O-K | 0 → π | — | P-J | 0 → π | — |
| O-L | 0 → π/2 | — | P-N | 0 → π/2 | — |
| N-O | −π/2 → 0 | — | M-P | −π/2 → 0 | — |
| N-M | −π/2 → −π/2 | 0° | M-I | −π/2 → 3π/2 | −90° |
| N-K | −π/2 → π | — | M-J | −π/2 → π | −60° |
| N-L | −π/2 → −π/2 | — | M-N | −π/2 → π/2 | 0° |
| F-O | π → 0 | — | D-P | π → 0 | — |
| F-M | π → π/2 | — | D-I | π → −3π/2 | −45° |
| F-K | π → −π | 0° | D-J | π → −π | 0° |
| F-L | π → −π/2 | +60° | D-N | π → −π/2 | +60° |
| B-O | −π/2 → 0 | — | H-P | −3π/2 → 0 | — |
| B-M | −π/2 → −π/2 | — | H-J | −3π/2 → 3π/2 | 0° |
| B-K | −π/2 → π | −60° | H-J | −3π/2 → π | +45° |
| B-L | −π/2 → π/2 | 0° | H-N | −3π/2 → π/2 | +90° |

In the first embodiment, the gate-signal generating circuit 40 classifies trajectories of the double differential phase signal ΔΔP into two groups: those that cross the zero level while going from π or 3π/2 to −π or −3π/2, or from −π or −3π/2 to π or 3π/2; and other trajectories, which may or may not cross the zero level. Timing pulses $X_T$ are generated only for trajectories in the first group, because only these trajectories cross levels $L_1$, $L_2$, and $L_3$ in the necessary sequence. Specifically, timing pulses are generated for ten of the sixty-four trajectories listed in Table 2: J-D, K-F, I-H, F-K, D-J, and H-I, which have zero crossings at 0°; and K-H, I-F, D-I, and H-J, which have zero crossings at ±45°. Of these, K-F and F-K occur both in the preamble and during data header and body transmission; the other trajectories occur only during data header and body transmission.

During data header and body transmission, the digital phase-locked loop 26 will receive, on the average, jitter-free timing pulses $X_T$ about %4 of the time, and timing pulses $X_T$ with ±45° jitter about %4 of the time. Jitter values of +45° and −45° will moreover tend to average out to zero. The digital phase-locked loop 26 will therefore be able to maintain clock synchronization even after the preamble ends, unless an unusual data pattern produces an extended interval without input of any timing pulses $X_T$, or with input mostly of pulses having +45° jitter, or mostly of pulses having −45° jitter.

If frequency offset is present as illustrated in FIG. 7, many unwanted delayed pulses $X_D$ will be produced due to zero crossings at random locations, but very few of these will be preceded and followed by crossings of the 3π/4 and −3π/4 levels ($L_1$ and $L_2$), so most of them will be blocked at the gate circuit 38. By classifying trajectories as described above, the first embodiment is able to eliminate most unwanted timing pulses.

Next a second embodiment of the invention will be described. The second embodiment reduces the risk of loss of synchronization after the preamble ends by producing a greater number of timing pulses $X_T$.

Figure 17:
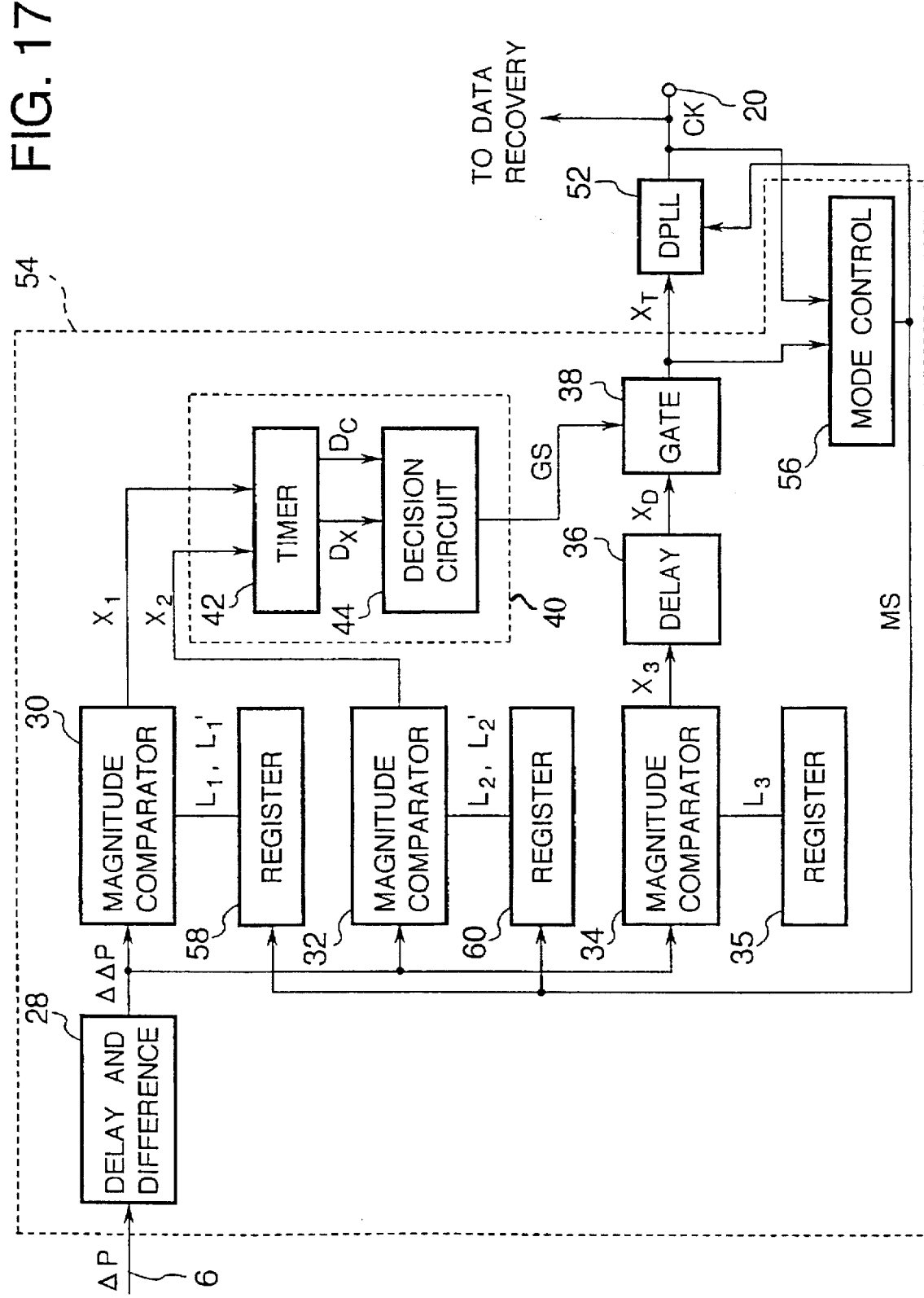
FIG. 17 is a block diagram of a second embodiment of the invention.

FIG. 17 shows the structure of the second embodiment, using the same reference numerals as in FIG. 3 to denote identical or equivalent elements. Descriptions of these elements will be omitted.

The digital phase-locked loop 52 in the second embodiment is similar to the digital phase-locked loop 26 in the first embodiment, but operates in two control modes, a fast mode and a slow mode. In the fast control mode, the digital phase-locked loop 52 responds to every timing pulse $X_T$, advancing the phase of the clock signal CK if a rising transition of CK lags the timing pulse $X_T$, and retarding the phase of the clock signal CK if a rising CK transition leads the timing pulse $X_T$. In the slow control mode, the digital phase-locked loop 52 responds not to these individual leads or lags but to the average lead or lag over a period of time, typically including a number of timing pulses $X_T$.

The digital phase-locked loop 52 is switched between its fast and slow control modes by a mode switching signal MS output from the timing pulse generating circuit 54, more specifically from a mode control circuit 56 in the timing pulse generating circuit 54. The mode control circuit 56 receives the timing signal $X_T$ and clock signal CK, compares their phase, and activates the mode switching signal MS when the phase difference is less than a certain threshold phase angle value, such as 45°, over a certain period of time. When the phase difference exceeds this threshold phase angle value, the mode control circuit 56 deactivates the mode switching signal MS.

The mode switching signal MS is also sent to the first and second registers 58 and 60, which supply comparison levels to the first and second magnitude comparators 30 and 32. When the mode switching signal MS is inactive, the first register 58 supplies the first magnitude comparator 30 with the same first level $L_1$ of $3\pi/4$ as in the first embodiment. After the mode switching signal MS becomes active, the first register 58 supplies the first magnitude comparator 30 with a reduced first level $L_1'$ of, for example, $\pi/4$, which is closer to zero. Similarly, the second register 60 supplies the second magnitude comparator 32 with a second level $L_2$ of $-3\pi/4$ while the mode switching signal MS is inactive, and a second level $L_2'$ of $-\pi/4$, closer to zero, when the mode switching signal MS is active.

Next the operation of the second embodiment will be described.

During the preamble, the phase difference between the timing signal $X_T$ and clock signal CK will usually start out at a value greater than 45°, making the mode switching signal MS inactive. The second embodiment will accordingly operate at first like the first embodiment, supplying the digital phase-locked loop 52 with jitter-free timing pulses $X_T$ in all symbol intervals.

When the phase of the clock signal CK is brought to within 45° of the phase of these timing signal $X_T$, the mode control circuit 56 activates the mode switching signal MS, causing the first and second levels $L_1$ and $L_2$ to switch from $\pm 3\pi/4$ to $\pm \pi/4$. This has the effect of moving points a and c in FIG. 8 closer to point b, and points d and f closer to point e, so the gate signal GS is shifted slightly to the left, but the delayed zero-matching pulses $X_D$ continue to fall within the active gate intervals. As long as the preamble continues, the gate circuit 38 continues to pass jitter-free timing pulses $X_T$ to the digital phase-locked loop 52 in every symbol interval. Although the digital phase-locked loop 52 is now operating in its slow control mode, since the timing pulses $X_T$ are jitter-free, the phase of the clock signal CK continues to be adjusted at substantially the same rate as before, until the clock signal CK is locked in phase to the timing pulses $X_T$.

When the preamble ends and transmission of the data header and body starts, the digital phase-locked loop 52 receives timing pulses $X_T$ for all twenty-eight of the zero-crossing points noted in Table 2, including twelve with zero jitter, four with jitter of ±45°, eight with jitter of ±60°, and four with jitter of ±90°. Since the digital phase-locked loop 52 is operating in its slow control mode, positive and negative jitter will tend to cancel out, so the risk of loss of synchronization due to jitter is small. On the average, the digital phase-locked loop 52 will receive timing pulses $X_T$ in 28/64 of the symbol periods, instead of 10/64 as in the first embodiment, and will receive jitter-free timing pulses $X_T$ in 12/64 of the symbol periods, instead of 6/64 as in the first embodiment, so the risk of loss of synchronization due to an inadequate number of timing pulses $X_T$ is also small.

Although the reduction of the first and second levels $L_1$ and $L_2$ from $\pm 3\pi/4$ to $\pm \pi/4$ in the second embodiment causes the digital phase-locked loop 52 to receive timing pulses $X_T$ with jitter of up to about ±90°, these levels of $\pm \pi/4$ are still adequate to block timing pulses $X_T$ from trajectories that cross the zero level near the center of the symbol interval. In particular, the unwanted timing pulses that would be generated by trajectories that weave around the zero axis in FIG. 7 are blocked in this way, because these trajectories do not cross the $\pi/4$ and $-\pi/4$ levels within the time Td.

The second embodiment accordingly provides adequate timing pulses $X_T$ for clock recovery with a high degree of reliability both during and after the preamble.

The present invention is not restricted to the embodiments described above, but includes various modifications. For example, the preamble signal need not be "10011001 . . . 1001;" other repetitive data patterns can be used instead. If necessary, one or more of the first, second, and third levels $L_1$, $L_2$, and $L_3$ can be altered to accommodate a different preamble pattern, or the number of levels can be increased to four or more.

It is also possible to practice the invention with only two levels. For example, successive matches of AAP with the zero level and a certain positive level (in either order) within a certain time could be detected, timing pulses being generated at a delay of T/2 from the zero-level match point.

The values of 120° and 160° for Tg and Td were shown only as examples. The invention can be practiced with other values for these times. The delay time in the delay circuit 36 and the phase difference at which the mode control circuit 56 activates the mode switching signal MS can also be modified as necessary.

Although the mode control circuit 56 was shown as an element of the timing pulse generating circuit 54 in FIG. 17, it can be an element of the digital phase-locked loop 52 instead. For example, since the digital phase-locked loop 52 has a circuit that detects average phase lead or lag over a certain interval of time for use in the slow control mode, this circuit can serve the function of the mode control circuit 56.

Applications of the invention are of course not limited to mobile digital communications; the invention can be practiced in any system employing π/4-shift QPSK. More generally, it can be practiced in any system that must recover data and a clock signal from an input signal having an eye pattern like the ones shown in FIGS. 4 and 5, in which each eye corresponds to one symbol interval, and values of the input signal at the centers of the symbol intervals correspond in one-to-one fashion to the data symbols to be recovered.

Those skilled in the art will recognize that further variations are possible without departing from the scope claimed below.

What is claimed is:

1. A clock recovery circuit for recovering a clock signal from an input signal that follows trajectories which, when superimposed, form an eye pattern, comprising:

a delay-and-difference circuit for receiving said input signal, delaying said input signal by a certain first time to obtain a delayed signal, and taking a difference between said input signal and said delayed signal to obtain a differential signal;

a plurality of comparators coupled to said delay-and-difference circuit, for comparing said differential signal with a corresponding plurality of different levels, and generating respective pulse signals when said differential signal matches said levels;

a gate-signal generating circuit coupled to said comparators, for detecting timing relationships among said pulse signals, and activating a gate signal for a certain second time responsive to certain sequences of said pulse signals and to said timing relationships;

a delay circuit coupled to one of said comparators, for delaying the pulses generated by said one of said comparators by a certain third time to obtain delayed pulses;

a gate circuit coupled to said delay circuit, for outputting said delayed pulses as timing pulsed when said gate signal is active; and a phase-locked loop coupled to said gate circuit, for generating said clock signal and locking said clock signal in phase to said timing pulses.

2. The clock recovery circuit of claim 1, wherein said first time is equal to one period of said clock signal.

3. The clock recovery circuit of claim 1, wherein said third time is equal to one-half of one period of said clock signal.

4. The clock recovery circuit of claim 1, wherein:

said phase-locked loop has a fast control mode and a slow control mode; and said clock recovery circuit has a mode control circuit coupled to said phase-locked loop, for receiving said timing pulses and said clock signal, generating a mode selection signal, setting said mode selection signal to a first state selecting said fast control mode when said clock signal differs in phase from said timing pulses by more than a certain threshold quantity, and setting said mode selection signal to a second state selecting said slow control mode when said clock signal differs in phase from said timing pulses by less than said threshold quantity.

5. The clock recovery circuit of claim 4, wherein said mode selection signal also selects values of at least of one of said levels.

6. A clock recovery circuit for recovering a clock signal from a differential phase signal, comprising;

a delay-and-difference circuit for receiving said differential phase signal, delaying said differential phase signal by a certain first time to obtain a delayed signal, and taking a difference between said differential phase signal and said delayed signal to obtain a double differential phase signal;

a first comparator coupled to said delay-and-difference circuit, for generating a first pulse when said double differential phase signal matches a certain positive level;

a second comparator coupled to said delay-and-difference circuit, for generating a second pulse when said double differential phase signal matches a certain negative level;

a third comparator coupled to said delay-and-difference circuit, for generating a third pulse when said double differential phase signal matches a zero level;

a gate-signal generating circuit coupled to said first comparator and said second comparator, for activating a gate signal for a certain second time when said first pulse is followed by said second pulse within a certain third time, and for activating said gate signal for said second time when said second pulse is followed by said first pulse within said third time;

a delay circuit coupled to said third comparator, for delaying said third pulse by a certain fourth time to obtain a delayed pulse;

a gate circuit coupled to said delay circuit, for outputting said delayed pulse as a timing pulse if said gate signal is active; and a digital phase-locked loop coupled to said gate circuit, for generating said clock signal and adjusting said clock signal in phase so as to synchronize a certain transition of said clock signal with said timing pulse.

7. The clock recovery circuit of claim 6, wherein said first time is equal to one period of said clock signal.

8. The clock recovery circuit of claim 6, wherein said fourth time is equal to one-half of one period of said clock signal.

9. The clock recovery circuit of claim 6, wherein said gate-signal generating circuit comprises:

a timer for receiving said first pulse and said second pulse and measuring elapsed time from each pulse thus received; and a decision circuit for activating said gate signal responsive to two pulses most recently received by said timer, and to the elapsed time between said two pulses.

10. The clock recovery circuit of claim 6, wherein said digital phase-locked loop adjusts said clock signal at a first rate when said clock signal differs in phase from said timing signal by more than a certain phase angle, and at a second rate when said clock signal differs in phase from said timing signal by less than said phase angle, said first rate being faster than said second rate.

11. The clock recovery circuit of claim 10, comprising a mode control circuit for detecting a phase difference between said clock signal and said timing pulse, and generating a mode selection signal that switches said digital phase-locked loop between said first rate and said second rate.

12. The clock recovery circuit of claim 11, wherein said mode selection signal also switches said positive level and said negative level between a first pair of levels when said clock signal differs in phase from said timing signal by more than said phase angle, and a second pair of levels when said clock signal differs in phase from said timing signal by less than said phase angle.

13. The clock recovery circuit of claim 11, wherein said second pair of levels is closer to said zero level than is said first pair of levels.

14. A method of recovering a clock signal from a differential phase signal, comprising the steps of:

delaying said differential phase signal by a certain first time to obtain a delayed differential phase signal;

taking a difference between said differential phase signal and said delayed differential phase signal to obtain a double differential phase signal;

comparing said double differential phase signal with a plurality of levels, and generating respective pulse signals when said double differential phase signal matches said levels;

detecting certain sequences of said pulse signals;

activating a gate signal for a certain second time when said certain sequences are detected;

delaying one of said pulse signals by a certain third time to obtain a delayed pulse signal;

outputting said delayed pulse signal as a timing signal when said gate signal is active; and generating said clock signal and locking said clock signal in phase to said timing signal.

15. The method of claim 14, wherein said first time is equal to one period of said clock signal.

16. The method of claim 14 wherein, in said step of generating said clock signal, locking of said clock signal in phase to said timing signal is performed in a fast control mode when said clock signal differs in phase from said timing signal by more than a certain quantity, and in a slow control mode when said clock signal differs in phase from said timing signal by less than said certain quantity.

17. The method of claim 14, wherein said plurality of levels comprises a positive level, a negative level, and a zero level.

18. The method of claim 17, wherein said certain sequences include:

a pulse signal generated when said double differential phase signal matches said positive level followed, within a certain fourth time, by a pulse signal generated when said double differential phase signal matches said negative level; and a pulse signal generated when said double differential phase signal matches said negative level followed, within said fourth time, by a pulse signal generated when said double differential phase signal matches said positive level.

19. The method of claim 17, wherein said delayed pulse signal is obtained by delaying a pulse signal generated when said double differential phase signal matches said zero level.

20. The method of claim 19, wherein said third time is equal to one-half of one period of said clock signal.

21. The method of claim 17, comprising the further step of switching said positive level and said negative level between a first pair of levels when said clock signal differs in phase from said timing signal by more than said certain quantity, and a second pair of levels when said clock signal differs in phase from said timing signal by less than said certain quantity.

22. The method of claim 21, wherein said second pair of levels is closer to said zero level than is said first pair of levels.

* * * * *